July 25, 1933.  H. A. DOUGLAS  1,919,206
SIGNALING SYSTEM FOR AUTOMOTIVE VEHICLES
Filed May 16, 1929  2 Sheets-Sheet 1
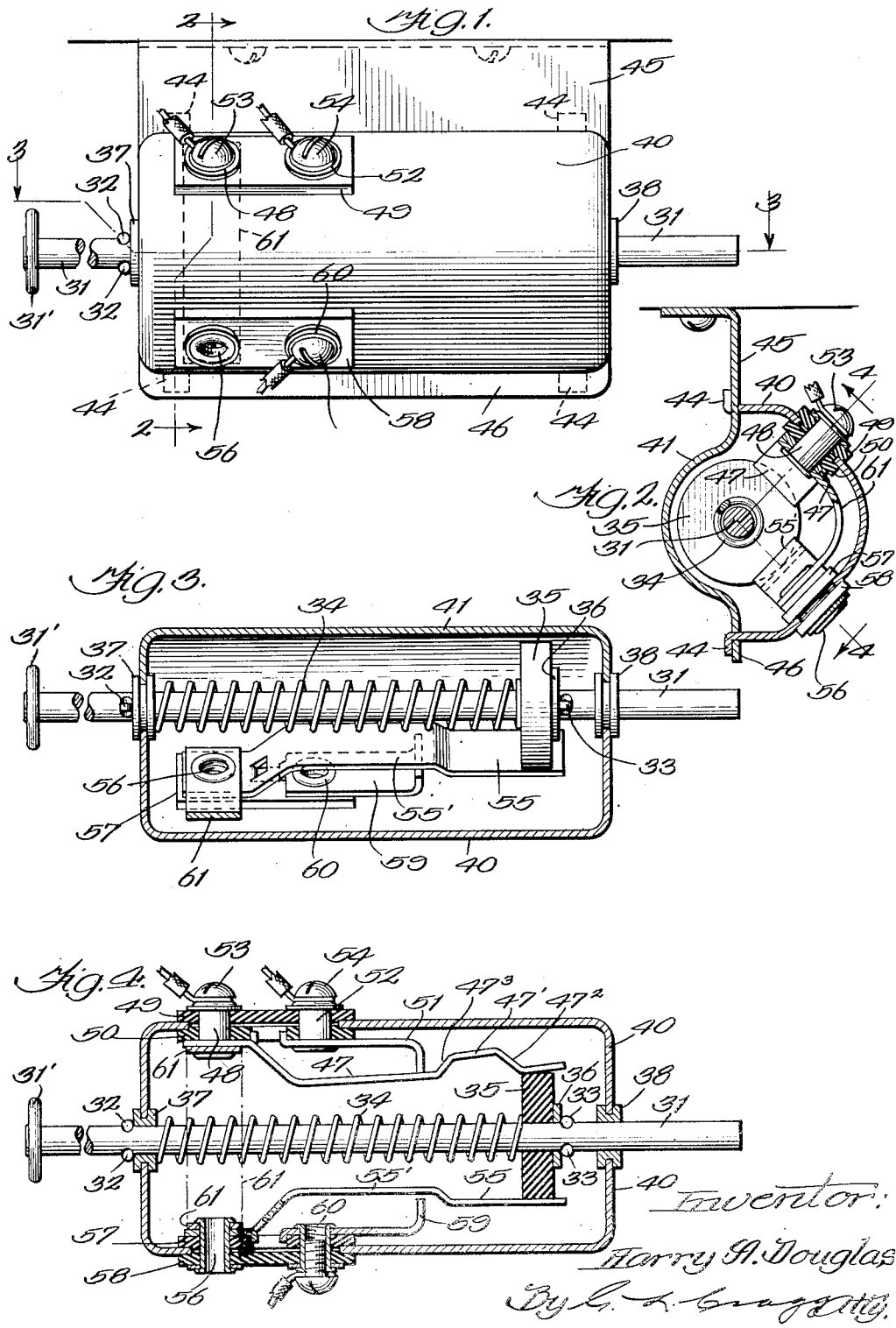

July 25, 1933.         H. A. DOUGLAS         1,919,206
SIGNALING SYSTEM FOR AUTOMOTIVE VEHICLES
Filed May 16, 1929         2 Sheets-Sheet 2
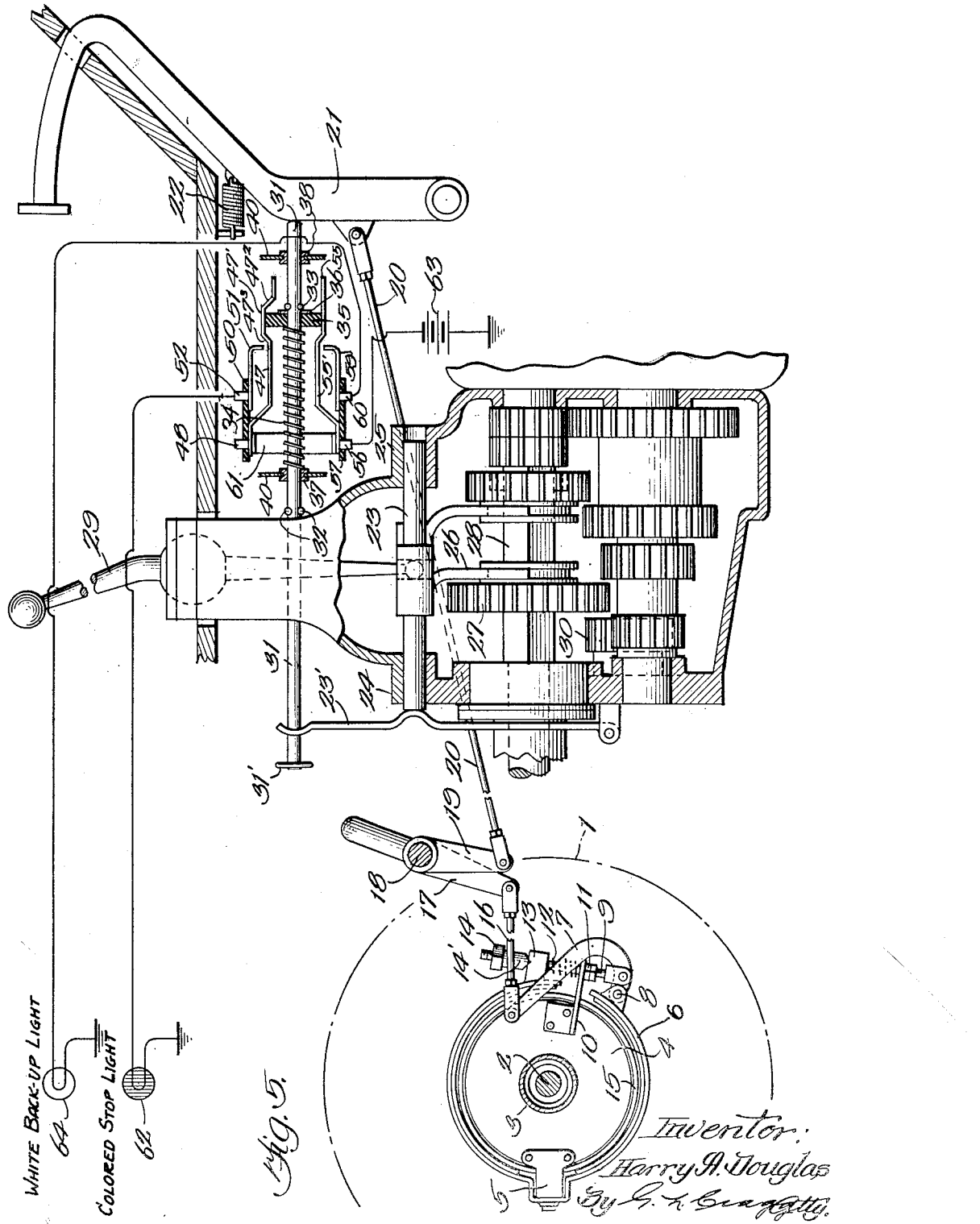

Patented July 25, 1933

1,919,206

UNITED STATES PATENT OFFICE

HARRY A. DOUGLAS, OF BRONSON, MICHIGAN

SIGNALING SYSTEM FOR AUTOMOTIVE VEHICLES

Application filed May 16, 1929. Serial No. 363,681.

My invention relates to signaling systems for automotive vehicles and resides in the provision of switching mechanism whose actuating means is operable by the brake applying mechanism and the mechanism effecting reverse or backward movement of an automobile vehicle. This actuating means has one range of operation when it is operated by the brake applying mechanism, to effect the display of a stop signal such as an incandescent lamp, and another range of operation when it is operated by the mechanism that effects the backward or reverse travel of the vehicle to operate a back up signal. The ranges of operation are desirably of different extent and in overlapping relation, whereby the switching mechanism may be made as compact as desirable. The actuating member is desirably inclusive of a rod which is positively moved in one direction by one of the aforesaid automotive vehicle controlling mechanisms and is moved in the reverse direction by a spring which thrusts the rod against a member of the other vehicle controlling mechanism. For example, the mechanism that effects the backward or reverse travel of the vehicle may be arranged to pull upon the switch rod when this mechanism is employed for its purpose and the spring which presses upon the rod may serve to position it against the pedal lever of the braking mechanism, the spring being of sufficient strength and extent to follow the pedal lever and casing portion of the stop signal which pertains to the braking mechanism.

A large percentage of the automobiles now produced employ in addition to the red tail light, a colored stop light controlled by the brake pedal and a white back-up light controlled by the reversing mechanism. My invention, among other objects, effects novel provision for illuminating the stop light whether the braking mechanism or the reversing mechanism be actuated. Thus when the driver of the vehicle intends to back up, he may have the colored stop light illuminated as a warning to those behind him that he is not moving forward and at the same time he may have the white back-up light illuminated to provide vision in backing up. The white light would not give the necessary warning which a colored light gives and a colored light would not provide the vision which a white light does. The colored light alone is a stop signal, whereas the combination of the colored light and the white light acts as a back-up signal in addition to providing for vision.

The invention will be more fully explained in connection with the accompanying drawings in which Fig. 1 is a side elevation of a preferred switch structure; Fig. 2 is a sectional view on line 2—2 of Fig. 1; Fig. 3 is a sectional view on line 3—3 of Fig. 1; Fig. 4 is a sectional view on line 4—4 of Fig. 2; and Fig. 5 is a view somewhat diagrammatic illustrating a braking and reversing mechanism of an automotive vehicle in operating relation with my switching mechanism, the signal circuits governed by the switching mechanism being also diagrammatically indicated.

The automotive vehicle mechanism illustrated is provided with vehicle wheels. One of these wheels, indicated at 1, is one of the rear driving wheels which is carried upon one section 2 of the driving shaft, these shaft sections being coupled by differential gearing as is well understood. This driving shaft, having the differentially coupled sections 2, is enclosed by a stationary housing indicated at 3. A stationary disc 4 is mounted upon each end of the housing, each driving wheel having such a disc at its inner side. Each disc carries a stationary bracket 5 and each bracket carries a brake band 6, in the form of a split collar, the bracket being secured to the collar near the mid-portion thereof. A lever 7 is pivoted, at one end, to and near one end of each collar, such a point of pivotal connection being indicated at 8. A rod 9 has one end in pivotal connection with each lever 7 and near the pivot 8 of such lever. This rod passes through a bracket 10 upon the corresponding disc 4. Nuts 11 upon each rod engage the underside of the corresponding bracket 10. A coiled spring 12 surrounds each rod 9 and is interposed between the top side of the corresponding bracket 10 and a lug 13 that is provided upon the corresponding brake band 6 and at the other end of this brake band opposite the pivot 8. A nut 14 is screwed upon the upper end of each rod 9, this nut having a continuation 14' which bears upon the top side of the corresponding lug 13. When the upper end of the lever 7 is pulled to the right, the brake band 6 is contracted to engage the brake drum 15 surrounding the corresponding disc 4. Each brave lever 7 has its upper end connected by a link 16 with an arm 17 which is fixed upon a brake rod 18 that extends between both braking mechanisms pertaining to the vehicle wheels 1. Another arm 19 is also fixed upon the brake rod 18. This latter arm is connected by a link 20 with an intermediate portion of the pedal lever 21. Each time said pedal lever is depressed it moves in a clockwise direction and pulls the link 20 to the right to cause a partial rotation of the rod 18 in a counterclockwise direction. Said rod, in thus turning, moves both arms 17 in a counterclockwise direction. These arms turn the brake levers 7 in a clockwise direction to contract the brake bands 6 and frictionally engage these bands with the corresponding brake drums 15. When the pedal lever 21 is released the spring 22 serves to restore it by turning it in a counter-clockwise direction, whereby the brakes are released. When the brakes are released the springs 12 take part in opening the brake bands. This braking mechanism is well known and has only been described, to some extent, because of its interrelation with my switching mechanism.

The gear shifting mechanism illustrated is also well known. It will suffice to mention the portions thereof which are concerned in reversing the direction of travel of the automotive vehicle, at which time the switching mechanism of my invention is also brought into play. A yoke rod 23 is disposed in guideways 24, 25 which are provided in the gear casing. The yoke 26 which is carried by the yoke carrying rod 23 is received within an annular groove provided in the hub of the spur gear 27. This spur gear has a square hole through its central or hub portion which snugly receives the square shaft 28 which turns in a fixed plane and along which the gear 27 may slide. When the shift lever 29 is properly placed in a forward position the spur gear 27 is moved rearwardly into mesh with the spur pinion 30 which is so driven by the engine as to effect a reversal in the normal direction of rotation of the shaft 28, whereby the shaft sections 2 have their normal direction of rotation reversed to cause the vehicle to move backwardly.

I will next describe the preferred form of switch mechanism and thereafter set forth its interrelation with the braking and reversing mechanism.

The switch contact actuating member includes a reciprocable rod 31 made preferably of iron or steel. Two abutments or sets of abutments 32 and 33 are desirably integrally formed with the rod and are spaced apart longitudinally of the rod. A coiled spring 34 surrounds the rod and is disposed between said abutments. A switch controlling collar 35, formed preferably of insulation, is slipped upon one end of the rod, together with a washer 36, before the abutments on this end of the rod are formed, said washer being interposed between said collar and the abutments 33, said collar being disposed between the abutments 32 and 33 and between one end of the spring 34 and the abutments 33. A bearing sleeve 37 surrounds and is in sliding relation to the rod 31 and is interposed between the abutments 32 and the other end of the spring 34, this bearing sleeve 37 being consequently interposed between the abutments 32 on one end of the rod and the abutments 33 on the other end of the rod. The spring 34 is compressed between the bearing sleeve 37 and the collar 35 whereby the collar 35 and washer 36 are pressed against the abutments 33 and the abutments 32 are pressed against the sleeve 37. A second bearing sleeve 38 also surrounds and is in sliding relation to the rod, the abutments 33 being between the collar 35 and this second bearing sleeve 38.

The switch carrier or casing is made in two sections, one a cap section 40 and the other a mounting section 41, the two casing sections meeting upon a plane that contains the axis of the rod when the rod is assembled with the casing. The end walls of the casing sections 40 and 41 are formed with circular openings through which rod 31 passes and which are complete when the casing sections are assembled.

As illustrated, the casing section 40 is formed with ears 44 that are passed through openings formed in the wings 45 and 46 that project from the longitudinal margins of the casing section 41, these ears being thereafter turned into clinching engagement with said wings. The end walls of the casing firmly hold bearing sleeves 37 and 38 in fixed relation so that the rod 31 may be moved against the force of the spring 34.

The rod 31 is pressed by the spring 34 against the pedal lever whereby the rod follows all movements of the pedal lever. The spring 34 directly causes the operation of the stop signal as this spring expands during the brake operating movement of the pedal lever. When the pedal lever is released the spring 22 is effective in pushing upon the rod 31 against the force of the spring 34, whereby the circuit previously closed by the latter spring is opened. The yoke rod 23 serves to pull upon the switch rod 31 when the reversing mechanism is used for its purpose, whereby the back up signal is displayed, as will appear. For this purpose the yoke rod is arranged to operate a lever 23' which is adapted to be brought into pulling relation with the flange 31' on the rod 31. Lost motion relation is normally present between the parts 23' and 31' which is equal to the range of operation of the rod 31 that is jointly controlled by the pedal lever 21 and spring 34, so that the part 23' will not interfere with the control of the rod 31 by said spring and pedal lever. When the yoke rod 23 is operated to effect the reversal in travel of an automotive vehicle, the end of the lever 23' that is to engage the flange 31', absorbs the lost motion between this lever and flange and thereafter continues pulling movement upon the rod 31 to cause the operation of the back up signal. The switch contact structure, which is operated by the spring 34 when this spring functions upon the operation of the pedal lever 21, is inclusive of a contact arm 47 in the form of a leaf spring. This contact arm is anchored, at one end, by a riveting sleeve 48, this spring arm end and two bars of insulation 49 and 50 being clamped between the flanges or heads upon the riveting sleeve. Said bars 49, 50 are disposed at an opening in the casing section 40 and grip marginal portions of the opening therebetween. Said bars are desirably provided with opposed facial portions that enter the opening in the casing so as to position the bars. A spring contact 51 is complemental to the contact arm 47 and is anchored in a manner similar to that in which the arm 47 is anchored, by means of the riveting sleeve 52. The sleeves 48 and 52 have threaded bores to receive binding screws 53 and 54 which connect circuit wires with said sleeves and the contacts assembled with the sleeves.

The switch contact structure which is operated by the yoke rod 28 and the spring 34 is inclusive of a contact arm 55 in the form of a leaf spring. This contact arm is anchored, at one end, by a riveting sleeve 56, this spring arm end and two bars of insulation 57 and 58 being clamped between the flanges or heads upon this riveting sleeve. Said plates are disposed at an opening in the casing section 40 and grip marginal portions of the opening therebetween. Said bars are desirably provided with opposed facial portions that enter the opening in the casing so as to position the plates. A spring contact 59 is complemental to the contact arm 55 and is anchored in a manner similar to that in which the arm 55 is anchored, by means of the riveting sleeve 60. The sleeves 56 and 60 have threaded bores to receive binding screws which connect circuit wires with said sleeves and contacts assembled with the sleeves. A metallic strap 61 is clamped between the inner flanges upon the riveting sleeves 48 and 56 and the switch arms 47 and 55, whereby these switch arms are electrically connected.

The switch contact arm 47 is so related to the insulating ring 35 as to be capable of circuit closing actuation by the spring 34, the pedal lever 21 simply permitting this spring thus to operate when the brakes are applied. The said switch arm is self-restoring when the ring 35 is moved to its normal position upon the restoration of the pedal lever to its normal position. The switch arm 47 is, therefore, equipped with a recessed or depressed portion 47' which normally receives the ring 35 to permit the arm 47 to occupy and maintain a circuit opening position, due to its own resilience. When the pedal lever is operated to apply the brakes the sloping portion $47^2$ of the arm rides upon the ring 35 to ultimately bring the switch arm 47 into engagement with its complemental contact 51. When the pedal lever is restored the travel of the sloping portion $47^2$ upon the ring 35 is reversed until the circuit is opened. When the contacts 47 and 51 are engaged, the circuit for the stop light 62 is closed, this circuit being traceable from the grounded lamp 62 through the contacts 51 and 47, the metallic strap 61, the riveting sleeve 56 and the batter 63 to ground.

The distance between the flange 31' upon the rod 31 and the free end of the lever 23', which obtains when the pedal lever 21 is in normal position and the vehicle is not in reverse, is substantially equal to the range of travel of the ring 35 in exercising control of the stop light circuit that includes the lamp 62. When the yoke rod 23 is operated in adjusting the vehicle to be in reverse, the lever 23' will engage the flange 31' and move the ring 35 to the left to establish the circuit of the back up signal 64, the previously described range of movement of the ring 35 being increased sufficiently to the left to enable this ring to ride up onto the hump 55' of the switch arm 55 to engage the switch arm with its complemental contact 59. When these two contacts are engaged, circuit for the lamp 64 is established and may be traced from this lamp, which is grounded, through the contacts 59 and 55 to the grounded battery 63. As illustrated the ring 35 is also adapted to close the circuit of the stop signal lamp 62 by enabling this ring to engage the sloping portion $47^3$ of the switch arm 47. It will be noted that the backing up light 64 is of the "white" type and serves to illuminate the road to the rear of the vehicle and thus assist the vision of the driver when backing. When the gear shifting mechanism is adjusted to bring the vehicle out of reverse the lever 23' is moved to the right, thereby permitting the spring 34 to move the ring 35 to the right sufficiently to permit the switch arms 47 and 55 to open their circuits, it being understood that the pedal lever 21 is then at its normal position in which the extent to which the spring 34 may thus operate is limited. This spring, therefore, is in circuit closing actuating relation to the stop signal contact 47 whenever the brakes are applied, the pedal lever 21 being in circuit opening relation to this contact when this pedal lever is released. Said spring in its relation to the reversing mechanism serves to restore the circuit opening adjustments of the contacts 47 and 55 when permitted so to do by the lever 23' in its idle position, under the assumption that the pedal lever 21 is released to be in a position to limit the extent to which the spring 34 may move the ring 35 to enable the contacts 47 and 55 to assume circuit opening positions.

It will be noted that the switch and associated structure heretofore described has the advantage of providing a single practical unit for controlling both the stop light and backing light circuits.

The stop light 62 desirably has a colored illuminating face, preferably of red glass, and the back-up light 64 a white or clear glass illuminating face, these faces being merely indicated diagrammatically in Figure 5.

Changes may be made without departing from the invention.

Having thus described my invention, I claim:

1. The combination with an automotive vehicle having a braking mechanism and travel reversing mechanism; of two electric circuits connected with a common source of current, one circuit including a colored stop light and the other circuit a white back-up light; a normally open switch for controlling each circuit; an operator common to both said switches; a spring constantly urging the operator to one position to close the switch controlling the stop light circuit, said operator being normally positioned against the influence of said spring by the brake mechanism when the latter is idle to permit both switches to remain open and released to the influence of said spring for movement to a position to close said switch controlling the stop light circuit as the brake mechanism is set; and means operated by the setting of the reversing mechanism to cause said operator to move against the influence of said spring to another position to close both the switch controlling the stop light circuit and the switch controlling the back-up light circuit.

2. The combination with an automotive vehicle having a braking mechanism and travel reversing mechanism; of two electric circuits, one including a colored stop light and the other a white back-up light; a normally open switch for controlling each circuit; an operator common to said switches; a spring constantly urging the operator to one position to close the switch controlling the stop light circuit, said operator being positioned against the influence of said spring by the brake mechanism when the latter is idle to permit both switches to remain open and released to the influence of said spring for movement to the position to close said switch controlling the stop light circuit as the braking mechanism is set; and a pivoted lever operated by the setting of the reversing mechanism to cause said operator to move against the influence of said spring to another position to cause the closing of both the switch controlling the stop light circuit and the switch controlling the back-up light circuit.

HARRY A. DOUGLAS.